June 6, 1939.   J. S. ABELL   2,161,219
PRISMATIC FRAME AND FLOATING BODY
Filed May 19, 1937    4 Sheets-Sheet 1
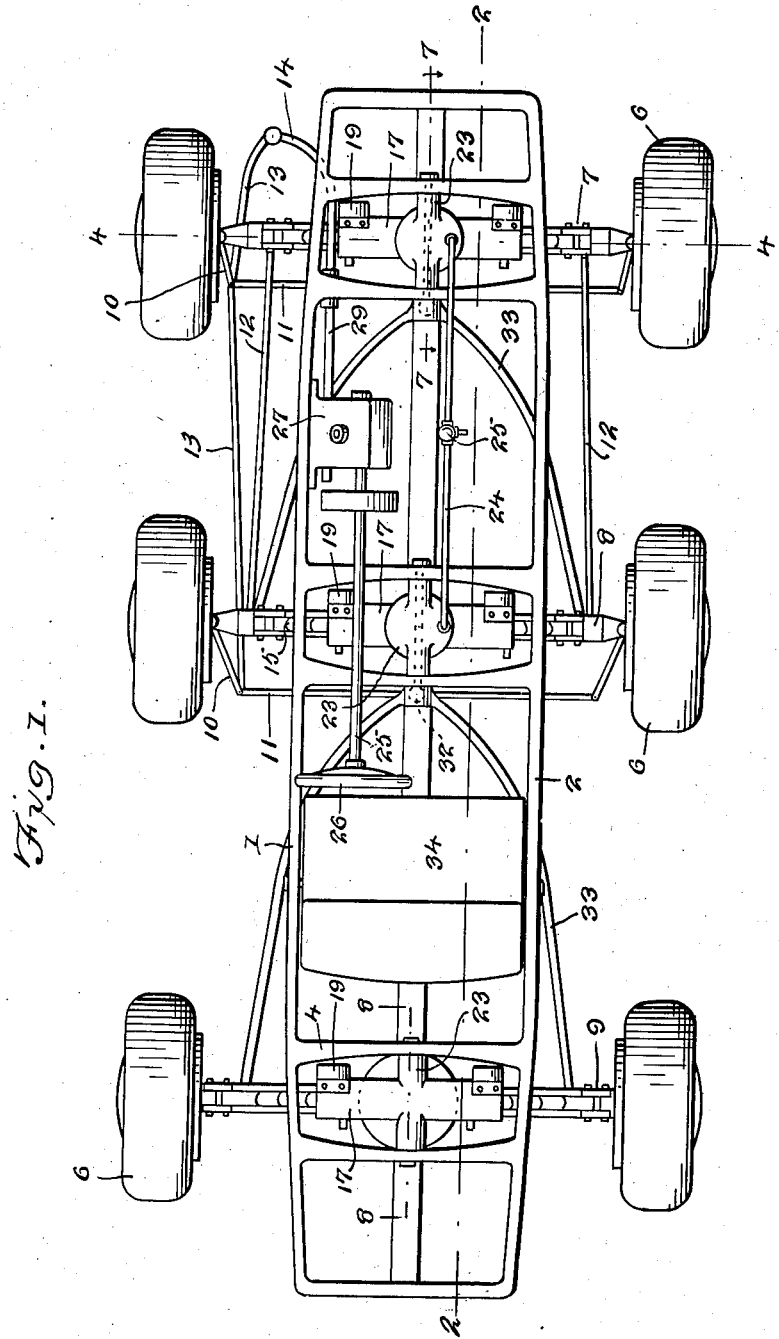
Joseph Spalding Abell
INVENTOR
BY Victor J. Evans & Co.
ATTORNEYS June 6, 1939.  J. S. ABELL  2,161,219
PRISMATIC FRAME AND FLOATING BODY
Filed May 19, 1937  4 Sheets-Sheet 2
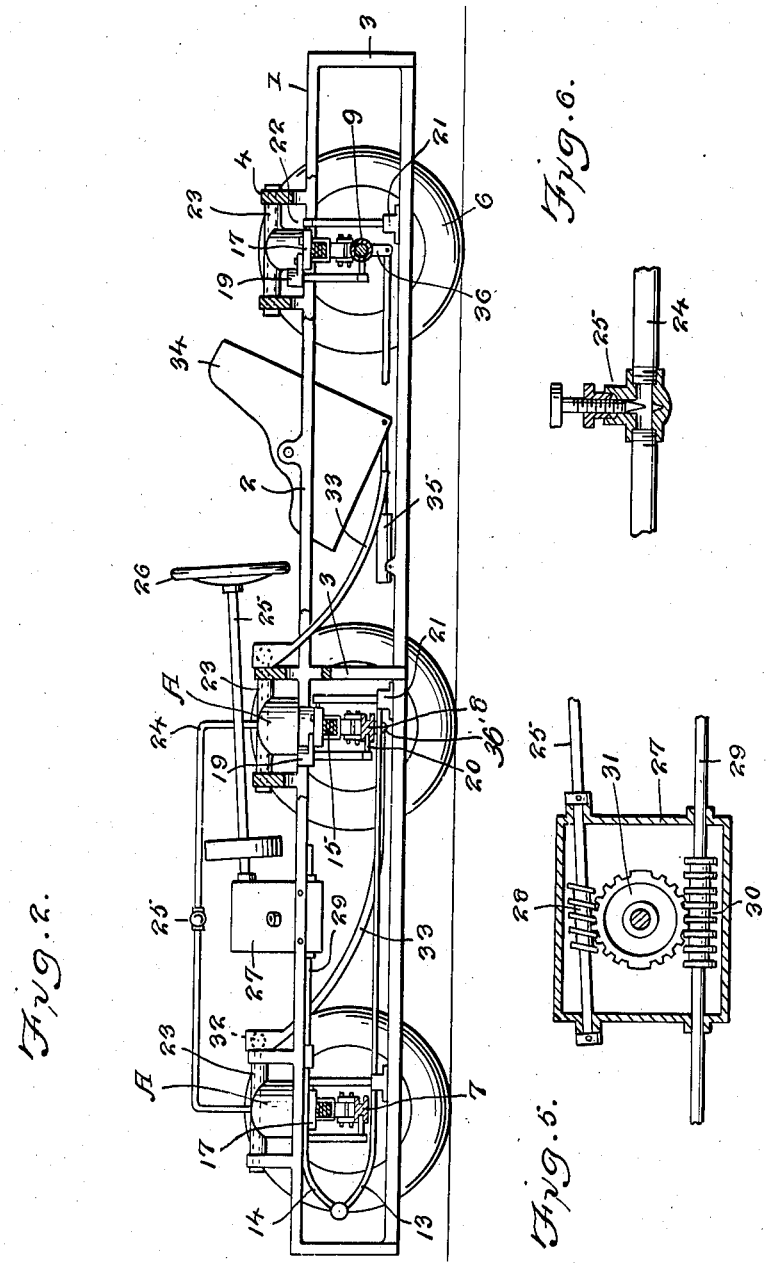
Joseph Spalding Abell
INVENTOR June 6, 1939. J. S. ABELL 2,161,219
PRISMATIC FRAME AND FLOATING BODY
Filed May 19, 1937 4 Sheets-Sheet 3
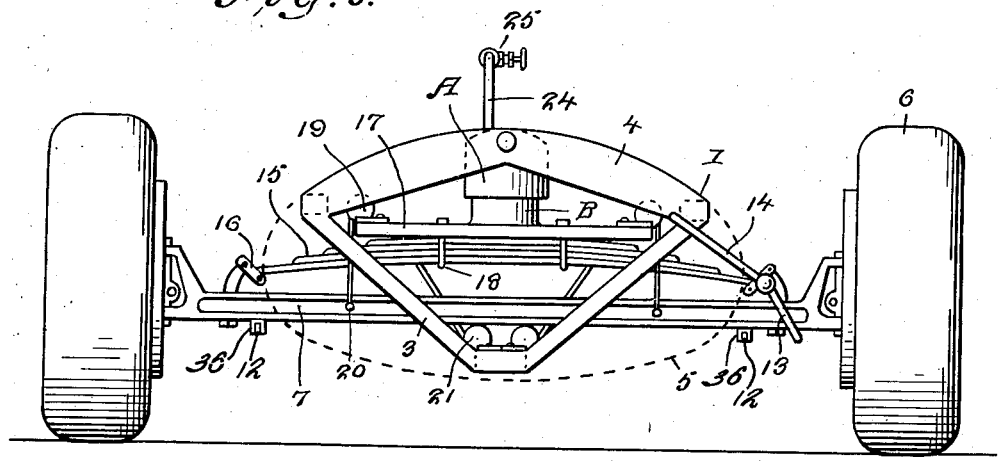
Joseph Spalding Abell
INVENTOR
BY Victor J. Evans & Co.
ATTORNEYS June 6, 1939.　　　　J. S. ABELL　　　　2,161,219
PRISMATIC FRAME AND FLOATING BODY
Filed May 19, 1937　　　4 Sheets-Sheet 4
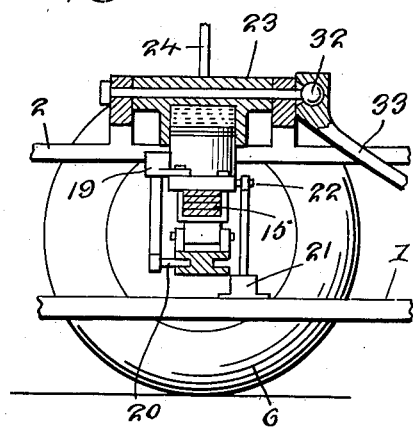
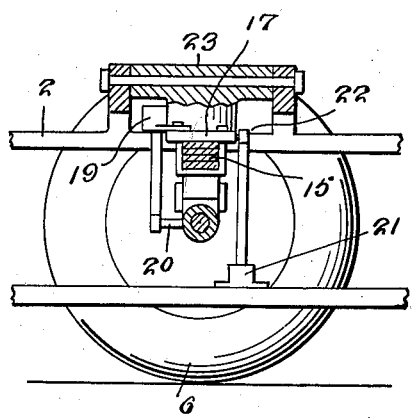
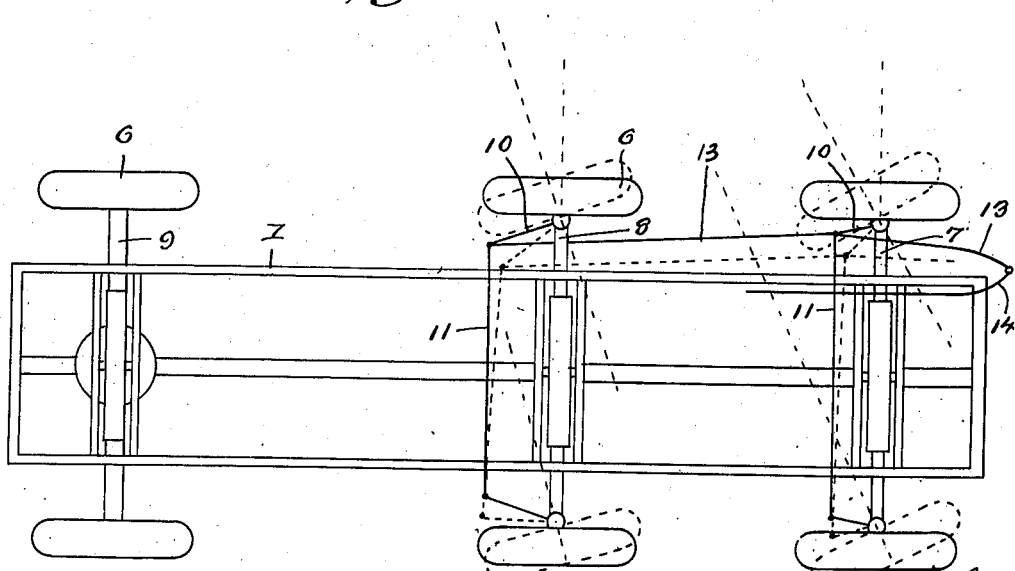
Joseph Spalding Abell INVENTOR
BY Victor J. Evans & Co.
ATTORNEYS Patented June 6, 1939

2,161,219

UNITED STATES PATENT OFFICE 2,161,219

PRISMATIC FRAME AND FLOATING BODY

Joseph Spalding Abell, Louisville, Ky., assignor of one-half to Dale Franklin Abell, Louisville, Ky.

Application May 19, 1937, Serial No. 143,595

3 Claims. (Cl. 280—112)

This invention relates to a vehicle chassis and has for its primary object the provision of a device of such a character that it will reduce skidding to a minimum, consequently materially reducing accidents and thereby increasing the safety of the occupants of the vehicle and also provide a device which will increase riding comfort by counteracting centrifugal forces and other forces tending to upset or destroy the occupants equilibrium.

With these and other objects in view, this invention consists in certain novel features of construction, combination, and arrangement of parts to be hereinafter more fully described and claimed.

For a complete understanding of my invention, reference is to be had to the following description and accompanying drawings, in which Figure 1 is a top plan view illustrating a vehicle chassis constructed in accordance with my invention.

Figure 2 is a sectional view taken on the line 2—2 of Figure 1.

Figure 3 is an end elevation illustrating my invention.

Figure 4 is a transverse sectional view taken on the line 4—4 of Figure 1.

Figure 5 is a detail sectional view illustrating a gear box and steering gears therein.

Figure 6 is a detail sectional view illustrating a control or regulating valve.

Figure 7 is a sectional view taken on the line 7—7 of Figure 1.

Figure 8 is a sectional view taken on the line 8—8 of Figure 1.

Figure 9 is a diagrammatical view showing several positions of the steering wheels of the vehicle.

Referring in detail to the drawings, the numeral 1 indicates a motor vehicle frame which is of prismatic shape or of substantially triangular shape in cross section and is constructed of longitudinally extending members 2 connected and held in proper relation by members 3. It may be desirable in order to give the frame 1 desired rigidity to have braces connecting certain of the members 2 and 3. These braces are not shown and may be of the X-type. The braces are omitted so as not to obstruct other parts of this invention. The apex of the frame is disposed lowermost, as shown in Figures 3 and 4 of the drawings. The frame also consists of transversely arranged members 4 for connecting the frame onto a running gear assembly which will be hereinafter more fully described. Secured to and underlying the frame is a wall construction 5 indicated by the dotted lines in Figure 3, the purpose of which is to close a portion of the frame and protect anything that may be mounted within the frame from foreign matter. A frame of the character described is capable of withstanding excessive strains and when damaged or twisted may be readily straightened. Also a frame of this character is economical to manufacture and will provide when mounted on the axle of the running gear assembly a low center of gravity for the vehicle. This is apparent in Figures 3 and 4 of the drawings as it will be noted that the apex of the frame is positioned normally below the axles. The frame will be considered as an unsprung mass in describing this invention while the running gear assembly will be considered the sprung mass.

The running gear assembly includes wheels, axles, springs and bars arranged within and transversely of the frame. The wheels are designated by the character 6, axles by the characters 7, 8 and 9. The axle 7 is arranged in the front, the axle 9 in the rear, and the axle 8 is arranged between the front and rear axles 7 and 9. The axles 7 and 8 are of the conventional steering type, while the axle 9 is of the driving type. The steering axles 7 and 8 include the usual steering arms 10 and connecting links 11. Rods 12 connect axles 7 and 8 to which they are attached at each end by hinges 36, the hinges 36 being spaced more widely on axle 8 than on axle 7, in order that when axle 7 is displaced to either side from its normal position there will be a compensatory movement to bring it back to normal, achieved by this mechanism in the following manner: The quadrangle formed by rods 12 and axles 7 and 8 is normally in a position so that axle 7 is parallel to axle 8. In the event that axle 7 is moved out of line to either side the quadrangle will function so as to cause axle 7 to take a position not parallel to axle 8. In order that the wheels of axles 7 and 8 may be steered simultaneously, certain arms 10 of the axles 7 and 8 are connected to a "hockey-stick" shaped steering rod 13 by ball and socket joints. The steering rod 13 being further connected by a ball and socket joint to the arm 14 of a steering mechanism carried by the frame and which will be herein described in detail. Now having axle 7 displaced to one side resulting in its not being parallel to axle 8 will cause one end of axle 7 to be more distant from a corresponding point on axle 8, while the other ends of axles 7 and 8 will be less distant from each other. The steering arms are on the other hand spaced at a constant distance by the steering rod 13. As a result the position of the steering arms will vary with the position of the axles 7 and 8 resulting in the realignment of the axles during forward progression on the part of the vehicle regardless of the direction of the displacement. The springs are indicated by the character 15 and are arranged to parallel the axles and are located above the latter. Spring shackles 16 connect the springs onto the axles. The bars are indicated by the character 17 and parallel the springs 15 and rest thereon being secured to said springs by clamps 18. Mounted on the ends of the bars 17 are shock absorbers 19 which in turn are connected onto the axles, as shown at 20. The shock absorbers 19 act to check vertical movements of the bars 17 relative to the axles. The longitudinal bar of the frame I which forms the apex of said frame has mounted thereon shock absorbers 21 which are connected on the bar 17, as shown at 22. The shock absorbers 21 act to check rotational movement on the part of the frame. The connections of the shock absorbers 21 on the bars 17 are adjacent the ends of said bars or adjacent to the shock absorbers 19.

Hangers 23 form part of the bars 17 and are pivotally mounted on the members 4 of the frame I. Thus it will be seen that the frame I is pivotally mounted on the running gear assembly for rotation about a longitudinal axis of the vehicle. The pivots are located to parallel the longitudinal axis and the center of gravity of the frame is below said pivots and normally when the vehicle is at rest or traveling upon level ground having a straight course disposed in vertical alignment with said pivots or the longitudinal axis of the vehicle. Therefore, it will be seen that the frame thus mounted on the running gear assembly is capable of tilting sidewise in either direction and the tilting of said frame in either direction gradually checked by the action of the shock absorbers 21.

The hangers are disposed directly above the vehicle springs and the axles and the hanger which is disposed over the rear axle is of a conventional mechanical construction while the hangers disposed over the axles 7 and 8 are of a hydraulic type each including a cylinder A and a piston B. The cylinder is pivoted on the frame and the piston is connected to its respective bar. The cylinders contain fluid and are connected by a pipe 24 having therein a control valve 25 for regulating the flow of liquid from one cylinder to the other.

The steering mechanism 14 includes a steering wheel 26 having secured thereto a steering post 25 which enters a gear box 27 mounted on the frame I. The gear box forms a journal for the steering post 25 and the latter has secured thereon a worm 28. A rod 29 is slidably supported by the gear box and is connected to the arm 13. A rack 30 is secured on the rod 29 and is located in the gear box. Journaled in the gear box is a combined worm gear and rack gear indicated by the character 31. The combined worm and rack gear while meshing with the worm 28 and the rack 30 connect the steering post to the rod 29 so that rotation of the steering post in opposite directions will bring about sliding movement of the rod 29 in opposite directions.

One end of the pivots which connect the hangers on the frame is in the form of a ball indicated by the character 32. Wishbone shaped truss rods 33 are provided with sockets to receive the balls 32 thereby providing a universal connection between the pivots and the truss rods. The truss rods are secured on the axles 8 and 9 by hinges 36'. Rods 12 are also attached on axles 7 and 8 by hinges 36. It is important to note that the pivotal connections between the frame and the running gears of axles 7, 8 and 9, and also the pivotal connections between the truss bars and the frame—all of these lie in a straight line.

Pivotally mounted on the frame is a seat 34 and connected with the latter and the frame is a dashpot mechanism 35. The dashpot mechanism is to resist the pivotal movement of the seat 34.

When the vehicle is traveling on a roadway in a straight course the center of gravity of the frame will maintain the latter on an even keel. However, when the vehicle under headway turns either to the right or left centrifugal forces act to shift the center of gravity of the frame and in a direction which will bring about raising of one side of the frame and lowering the other side. The side of the frame which is raised will be on the outside of the turn or curve made by the vehicle, consequently having effect in aiding in maintaining the equilibrium of the passengers occupying the seat of the vehicle. The tilting movement of the frame is resisted by the shock absorbers 21. Also said shock absorbers resist vertical movement of the frame relative to the running gear. The described action of the frame when the vehicle is making a turn or traveling upon a curve also will counteract centrifugal forces having a tendency to bring about side skidding of the vehicle on the roadway.

What is claimed is:

1. In combination with a running gear including wheels, axles supported thereby and springs supported by said axles, a vehicle frame of substantially triangular shape in cross section mounted on said running gear with the apex thereof disposed lowermost, pivotal means connecting the frame with the springs and located parallel with the longitudinal axis of the frame to permit side tilting of the frame, said pivotal means including base members paralleling the springs and secured thereto, shock absorbers connecting the base members of said pivotal means and the axle, and shock absorbers connecting the frame and the base members of said pivotal means at opposite sides of the longitudinal axis of the frame.

2. In combination with a running gear including wheels, axles supported thereby and springs supported by said axles, a vehicle frame of substantially triangular shape in cross section mounted on said running gear with the apex thereof disposed lowermost, pivotal means connecting the frame with the springs and located parallel the longitudinal axis of the frame to permit side tilting of the frame, said pivotal means including base members secured on the springs, shock absorbers connecting the base members of said pivotal means and the axle, and shock absorbers mounted on the apex of the frame and connected with said base members of the pivotal means at opposite sides of the longitudinal axis of the frame, said first and second-named shock absorbers acting in opposite directions.

3. A motor vehicle chassis comprising a frame of substantially V-shape in cross section, transverse members mounted on said frame, a running gear for said frame and including wheels, axles and springs with the latter paralleling and connected on said axles, bars secured to and paralleling the springs, pivots connecting said bars to said transverse members and paralleling the longitudinal axis of the frame to permit side tilting of the frame and locating the frame with respect to said running gear that the apex of the frame is below the springs and axles, shock absorbers connected to the ends of the bars and to the axles and located at opposite sides of the longitudinal axis of the frame, and shock absorbers secured on the apex of the frame and connected to the bars adjacent the ends and at opposite sides of the longitudinal axis of the springs, radius rods hinged on the axles and pivotally connected with the cross members of the frame in alignment with the axis of rotation of the frame about the running gear.

J. SPALDING ABELL.